United States Patent
Roy et al.

(10) Patent No.: US 9,631,534 B2
(45) Date of Patent: *Apr. 25, 2017

(54) ASSEMBLY AND METHOD FOR REDUCING NITROGEN OXIDES, CARBON MONOXIDE, HYDROCARBONS AND HYDROGEN GAS IN EXHAUSTS OF INTERNAL COMBUSTION ENGINES AND PRODUCING AN ELECTRICAL OUTPUT

(75) Inventors: Jean Roy, Middleton, MA (US); Robert A. Panora, Cambridge, MA (US); Joseph B. Gehret, Lynnfield, MA (US); Ranson Roser, Reno, NV (US)

(73) Assignee: Tecogen Inc., Waltham, MA (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/616,752

(22) Filed: Sep. 14, 2012

(65) Prior Publication Data
US 2013/0004392 A1   Jan. 3, 2013

Related U.S. Application Data

(63) Continuation-in-part of application No. 12/816,706, filed on Jun. 6, 2010, now Pat. No. 8,578,704.

(51) Int. Cl.
| | |
|---|---|
| *F01N 3/05* | (2006.01) |
| *F01N 3/02* | (2006.01) |
| *F01N 3/04* | (2006.01) |
| *F01N 3/10* | (2006.01) |
| *F01N 3/20* | (2006.01) |
| *F01N 5/02* | (2006.01) |
| *B01D 53/94* | (2006.01) |
| *F01N 13/00* | (2010.01) |

(52) U.S. Cl.
CPC .......... *F01N 3/05* (2013.01); *B01D 53/9454* (2013.01); *B01D 53/9477* (2013.01); *F01N 3/0205* (2013.01); *F01N 3/04* (2013.01); *F01N 3/101* (2013.01); *F01N 3/2046* (2013.01); *F01N 5/025* (2013.01); *F01N 13/009* (2014.06); *F01N 13/0097* (2014.06); *B01D 2258/014* (2013.01); *F01N 2240/36* (2013.01); *Y02T 10/16* (2013.01); *Y02T 10/22* (2013.01); *Y02T 10/26* (2013.01)

(58) Field of Classification Search
CPC .......... F01N 3/2046; F01N 5/025; F01N 1/14; F01N 2260/022; F01N 2270/02
USPC ........................................... 60/288, 289, 320
See application file for complete search history.

(56) References Cited

U.S. PATENT DOCUMENTS

| | | |
|---|---|---|
| 3,544,264 A | 12/1970 | Hardison |
| 3,662,540 A | 5/1972 | Murphey |
| 3,757,521 A | 9/1973 | Tourtellotte et al. |
| 3,867,508 A | 2/1975 | Hass |
| 3,943,709 A | 3/1976 | Holt |
| 4,100,994 A | 7/1978 | Stuart |

(Continued)

*Primary Examiner* — Jonathan Matthias
(74) *Attorney, Agent, or Firm* — Intrinsic Law Corp.; Ibrahim M. Hallaj

(57) ABSTRACT

An assembly and method for reducing nitrogen oxides, carbon monoxide, hydrocarbons and hydrogen gas in exhausts of internal combustion engines and simultaneously generating electrical power, wherein the exhaust is acted upon in a first stage catalytic converter and is at least in part passed through a thermoelectric generator for production of electrical power. The exhausts are thereafter directed to a second stage catalytic converter.

4 Claims, 8 Drawing Sheets

(56) References Cited

U.S. PATENT DOCUMENTS

| | | | |
|---|---|---|---|
| 4,156,346 A | | 5/1979 | Koide |
| 4,983,135 A | | 1/1991 | Boda et al. |
| 5,033,264 A | | 7/1991 | Cabral |
| 5,168,085 A | | 12/1992 | Addiego et al. |
| 5,250,268 A | | 10/1993 | Geiger |
| 5,426,934 A | | 6/1995 | Hunt et al. |
| 5,499,501 A | | 3/1996 | Kato et al. |
| 5,603,215 A | * | 2/1997 | Sung et al. ............ 60/274 |
| 5,609,021 A | | 3/1997 | Ma |
| 5,934,069 A | | 8/1999 | Hertl et al. |
| 6,016,654 A | | 1/2000 | Schatz |
| 6,171,556 B1 | | 1/2001 | Burk et al. |
| 6,178,744 B1 | | 1/2001 | Perset |
| 6,422,007 B1 | | 7/2002 | Hartick |
| 6,438,943 B1 | | 8/2002 | Yamamoto et al. |
| 6,568,179 B2 | | 5/2003 | Deeba |
| 7,171,800 B2 | | 2/2007 | Shih et al. |
| 7,263,826 B2 | | 9/2007 | Wu |
| 8,578,704 B2 | * | 11/2013 | Gehret et al. ............ 60/289 |
| 2004/0206069 A1 | | 10/2004 | Tumati et al. |
| 2006/0021332 A1 | | 2/2006 | Gaiser |
| 2008/0127913 A1 | | 6/2008 | Justin |
| 2011/0240080 A1 | * | 10/2011 | Prior et al. ............ 136/201 |
| 2011/0311421 A1 | * | 12/2011 | Backhaus-Ricoult et al. ............ 423/213.2 |

* cited by examiner

ASSEMBLY AND METHOD FOR REDUCING NITROGEN OXIDES, CARBON MONOXIDE, HYDROCARBONS AND HYDROGEN GAS IN EXHAUSTS OF INTERNAL COMBUSTION ENGINES AND PRODUCING AN ELECTRICAL OUTPUT

REFERENCE TO RELATED APPLICATIONS

This application is a continuation-in-part of U.S. patent application Ser. No. 12/816,706, filed Jun. 6, 2010, now U.S. Pat. No. 8,578,704 in the names of Joseph B. Gehret, Robert A. Panora, and Ranson Roser.

BACKGROUND OF THIS INVENTION

Field of Invention

This invention relates to treatment of exhausts of internal combustion engines, and more particularly to reduction of nitrogen oxides, carbon monoxide, hydrocarbons, and hydrogen gas prevalent in the exhausts of internal combustion engines, particularly spark-ignited, gaseous-fueled internal combustion engines, and to utilization of the exhaust of internal combustion engines for the production of electrical energy.

Description of the Prior Art

Spark ignited (SI) internal combustion (IC) engines operated with gaseous fuels produce small amounts of undesirable chemical compounds in the combustion chamber, compounds which are exhausted from the engine at high temperatures (800°-1250° F.). For fuels composed primarily of methane and other light hydrocarbons, the commonly regulated chemicals are nitrogen oxides (NO, $NO_2$, or generally $NO_X$) and carbon monoxide (CO). Nitrogen oxides are formed when nitrogen ($N_2$), a major component of air, reacts with oxygen ($O_2$), another component of air, and both are exposed to high temperatures and pressures in an engine combustion chamber. Carbon monoxide, on the other hand, is the consequence of failure of the fuel to completely react with oxygen, resulting in the formation of carbon dioxide ($CO_2$). CO and $NO_x$ are problematic pollutants inasmuch as their regulated values are in many geographical regions set at or below the limits of current technology.

In strictly regulated regions, current practice to control the emission from SI/IC engines fueled by methane-rich fuels (natural gas, bio-fuels, landfill gas, etc.), is to install systems in the engine exhaust ducting to eliminate, to the extent required by regulations, such chemicals. For smaller engines (less than 1000 bhp), the common aftertreatment system is a single stage catalyst. In small systems, the products of combustion exiting the engine are forced through a catalyst monolith (honeycomb structure with precious metal coating) which facilitates the desirable oxidation and reduction reactions:

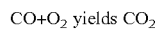

The nitrogen oxides are reduced to gaseous nitrogen ($N_2$) and Oxygen ($O_2$), both benign, while the carbon monoxide (CO) is completely oxidized, forming carbon dioxide ($CO_2$), likewise non-harmful and unregulated.

Current catalyst-based emissions systems rely on very accurate control of the engine's operating parameters to maximize the conversion efficiency of the reactions noted above. Specifically, the simultaneous elimination of $NO_X$ and CO through such reactions in a catalytic converter requires a precise operating window of the engine combustion process relative to the mixture of air and fuel. This is depicted in FIG. 1 for a typical SI/IC engine. As shown, rich mixtures result in low $NO_X$ out of the catalyst, but high CO, while lean mixtures result in low CO, but high $NO_X$. From FIG. 1, it is evident that simultaneous cleanup of $NO_X$ and CO requires that the engine air/fuel ratio (AFR) be precisely controlled in the narrow region around the stoichiometric air/fuel ratio. Compliance of both regulated pollutants can only be maintained when the combustion stoichiometry is maintained within points A and B of FIG. 1. The acceptable combustion mixture, to achieve increasingly strict emissions standards, requires that the engine AFR be controlled within narrow limits.

Referring still to FIG. 1, there is depicted typical engine emissions as a function of AFR from a SI/IC engine equipped with a single or multiple three-way catalyst (TWC). Meeting the regulated limits for CO and $NO_X$ require that engine AFR be maintained between points A and B of FIG. 1, a band approximately representing the stoichiometric AFR.

Stationary SI/IC engines operating in most applications in the U.S. and elsewhere are highly regulated relative to allowable CO and $NO_X$ emissions, which are becoming increasingly controlled. Most notably, the California Air Resource Board (CARB) now recommends limits of 0.07 lb/MWh and 0.1 lb/MWh CO as part of their 2007 standard for Combined Heat and Power (CHP) applications. Applying a heat recovery credit for maintaining a minimum 60% overall system efficiency and assuming a 27% electrical efficiency, the emissions limits stated in terms of actual concentration in the exhaust gas are 3.7 PPM $NO_X$ and 8.9 PPM CO. As used herein, "PPM" means parts per million by volume corrected to a standard air dilution factor (15% oxygen equivalent). The area of Southern California under the jurisdiction of the South Coast Air Quality Management District (SCAQMD) has adopted the "CARB 2007" standard for $NO_X$, while restricting CO emissions to a value close to the CARB limit. Other regions in California are likewise adopting similar standards, while other regions of the country (U.S.) are phasing in regulations approaching the CARB 2007 standards (MA, NY and NJ, for example).

Compliance with the newer standards requires extremely high conversion efficiency in the catalyst for both CO and $NO_X$. Extra-large conversion monoliths are needed in addition to extreme precision in controlling the air/fuel mixture.

FIG. 2 depicts the steady-state AFR control precision required for a standard engine (Model TecoDrive 7400) utilizing a TWC system sized to conform to CARB 2007. As indicated by a pre-catalyst narrow-band heated exhaust gas oxygen sensor millivolt (mV) output the AFR controller maintains via steady-state (non-dithering) AFR control. As shown in FIG. 2, the engine combustion mixture (air to fuel ratio) is acceptable for catalyst performance to regulated limits only when the signal from a standard lambda sensor in the exhaust duct is maintained between 680 and 694 mV. Above this range, the CO concentration exiting the catalyst exceeds the SCAQMD limit of 8.9 PPM. While below this range the $NO_X$ will rapidly exceed the 3.7 PPM limit. Limits shown in FIG. 2 are those of CARB 2007 with a credit for engine heat recovery, such that 60% of the fuel's heat content is purposefully used as electric power or recovered thermal energy. In order to maintain compliance, combustion air to fuel mixture must be maintained within the 14 mV window for the example shown.

A possible method for expanding the control window for engine operation to attain acceptable emissions from both CO and $NO_X$, is to modify the system such that two stages of catalyst systems are used, each operating in distinctly different chemical atmospheres. Early catalyst systems commonly used a two-stage design with inter-stage air injection. In this era, single purpose catalyst monoliths-oxidation or reduction, but not both, were employed. Later as multi-purpose, single stage catalysts (TWC) were developed, these became the dominant style. The early two-stage systems were employed in stationary gaseous fueled SI/IC engines with success but under far less strict standards. Presumably, the NO reformation problems encountered with the two-stage systems were present in the earlier era, but were inconsequential relative to the regulated limits at that time.

FIG. 3 depicts the above-described arrangement. As shown, two catalyst stages are plumbed into an exhaust system in series. Air is pumped into the exhaust stream between stage one (CAT 1) and stage 2 (CAT 2) and mixed thoroughly. The engine air-to-fuel ratio is maintained so as to facilitate effective $NO_X$ removal in the first stage. The air injected into the exhaust results in an oxidizing environment at the second catalyst stage biased towards the oxidation of CO to $CO_2$, even if the engine AFR is outside the acceptable operation window on the rich side, a highly significant benefit.

Tests utilizing the two-stage system demonstrated that the two-stage strategy with air injection was not only ineffective, but actually detrimental to catalyst performance. $NO_X$ emissions from the two-stage system were found to be generally higher than a single-stage system of comparable size and catalyst material loading. This surprising result indicated that a mechanism exists such that $NO_X$ is formed in the second stage, made possible by the oxygen rich environment, coupled also with conditions conducive to chemical reaction, i.e., high temperature and an abundance of a catalytic material.

An object of the invention is, therefore, to provide assemblies and methods for consistently and reliably removing nitrogen oxides and carbon monoxide, as well as hydrocarbons and hydrogen gas, from the exhausts of spark-ignited gaseous-fueled internal combustion engines.

A further object of the invention is to provide means within the inventive assemblies for cooling the exhaust gases, wherein the cooling means is operative to generate electricity which may be used to power electrically-driven components outside of the assemblies.

A still further object of the invention is to provide methods, used in conjunction with the aforementioned assemblies, for generating electricity by operation of the emission reducing assemblies.

SUMMARY OF THE INVENTION

With the above and other objects in view, a feature of the invention is the provision of assemblies and methods for effectively reducing nitrogen oxides, carbon monoxide, hydrocarbons and hydrogen gas in spark-ignited gaseous-fueled internal combustion engine exhausts, by presenting the gases entering a catalytic converter second stage at a lower temperature.

In accordance with the invention, the gases entering the second catalytic converter stage are cooled immediately following stage one, from the extremely high temperatures normally exiting the engine (800°-1250° F.) to a lower value. An intermediate temperature, or range of temperatures, provide desirable chemical reactions (CO and hydrocarbon removal) and are highly favored over those that are undesirable because of NO2 formation. This is deemed to be a particularly viable approach in combining heat and power (CHP) applications, inasmuch as the gases are cooled in a heat reclaim process. Doing so in a CHP application requires only that (1) the cooling stage by oriented to cool between stages, and (2) the cooling effectiveness be altered to reside in a favorable temperature range.

In accordance with a further feature of the invention, the cooling of the gases entering the second catalytic converter stage is undertaken in part by a thermoelectric generator which functions to generate useful electricity while cooling exhaust gases.

The above and other features of the invention, including various novel details of construction and combinations of parts and method steps, will now be more particularly described with reference to the accompanying drawings and pointed out in the claims. It will be understood that the particular assemblies and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the Drawings.

DESCRIPTION OF THE PREFERRED EMBODIMENTS

Figure 1:
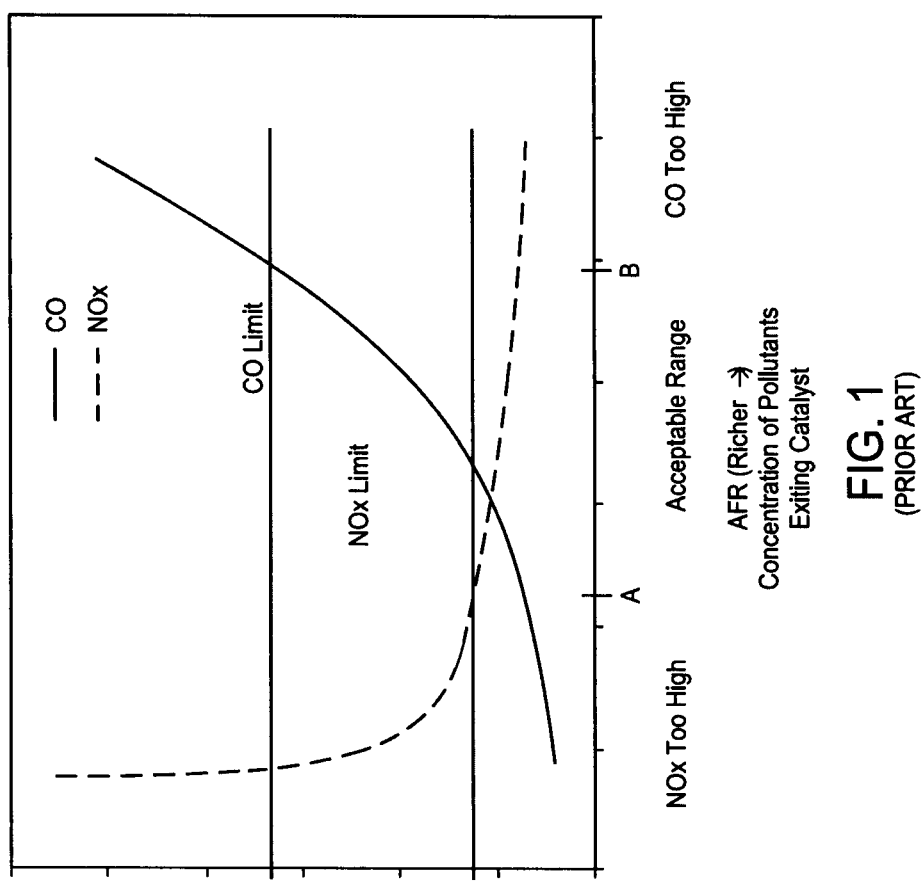
FIG. 1 is a chart depicting prior art relationships between nitrogen oxides and carbon monoxide present in engine exhausts gases, within and beyond acceptable ranges, given a precisely controlled air/fuel ratio.
Figure 2:
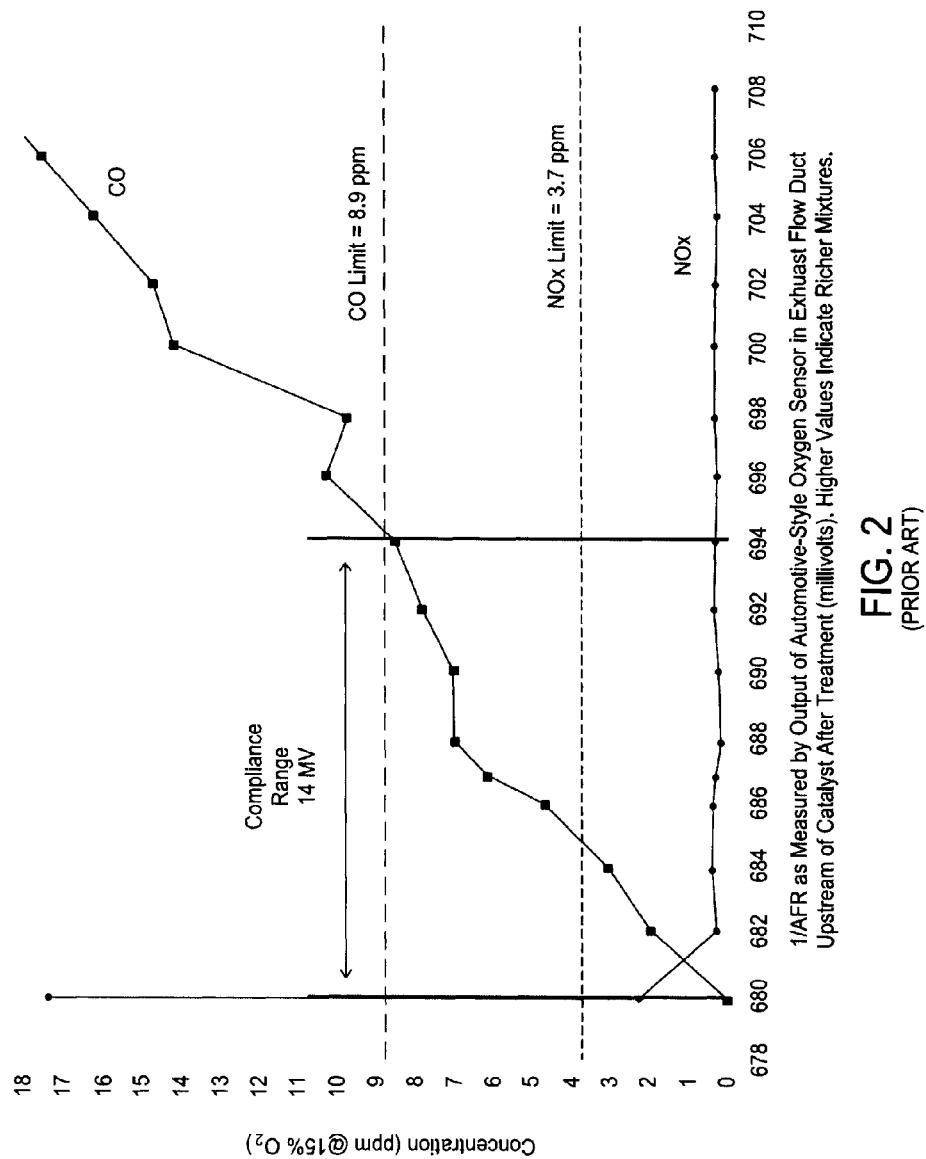
FIG. 2 is a chart illustrating the prior art steady-state air/fuel ratio control required for a standard engine, using a three-way catalyst.
Figure 3:
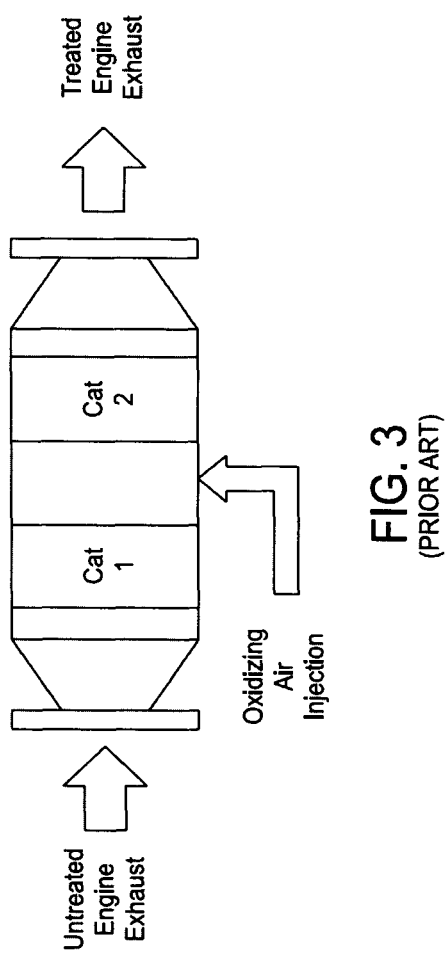
FIG. 3 is a diagrammatic depiction of a prior art two-stage catalyst system with inter-stage oxidizing air injection.
Figure 4:
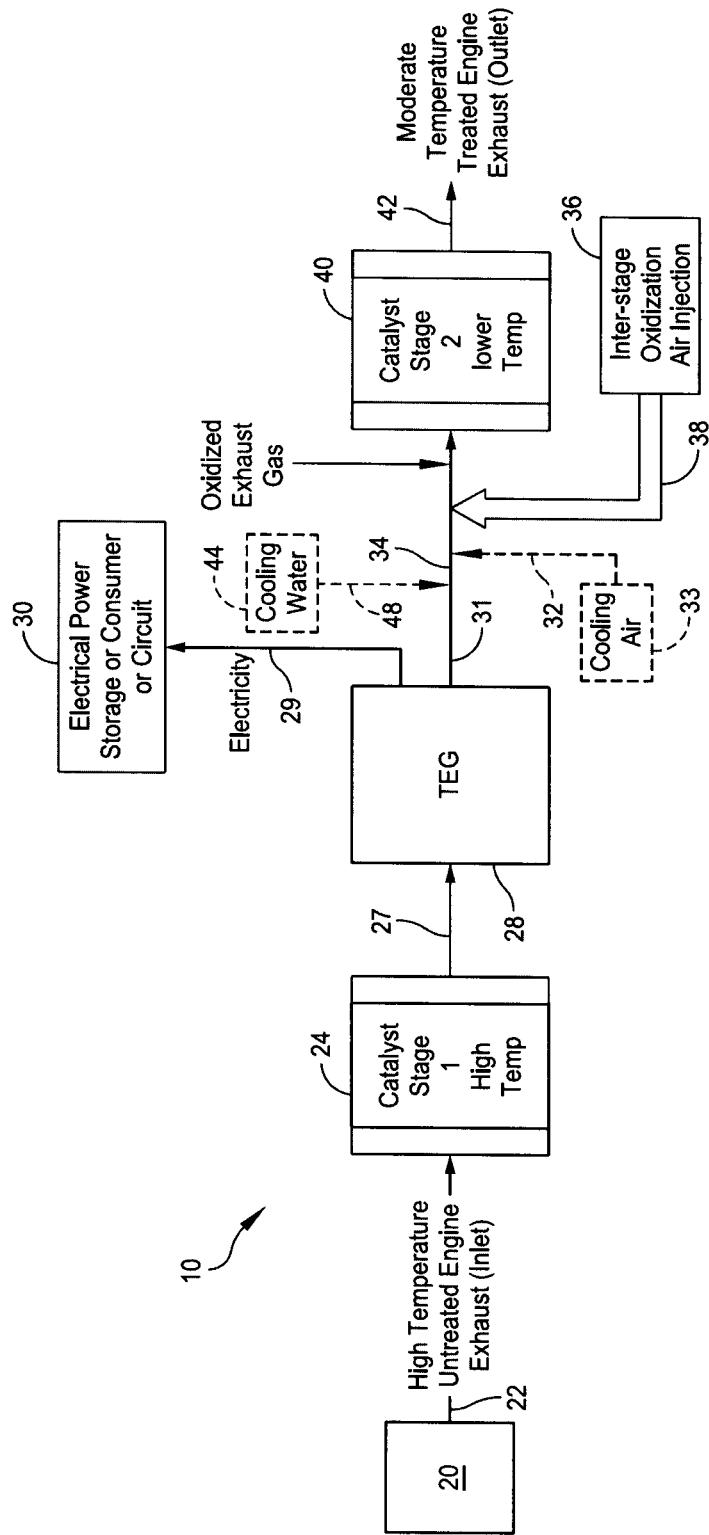
FIG. 4 is a diagrammatic depiction of an assembly and method for reducing nitrogen oxides, carbon monoxide, hydrocarbons and hydrogen gas in the exhaust of an internal combustion engine, and for simultaneously generating electrical energy.

Referring to FIG. 4, there is illustrated a two-stage system 10 with inter-stage cooling and electrical power generation. As shown in FIG. 4, the engine exhaust gases exit an engine 20 and are channeled by an exhaust gas conduit 22 to a catalytic converter first stage 24 having at least one, and preferably two, catalytic converters. Two catalytic elements are preferred, to achieve high performance in the first stage 24 relative to $NO_X$ removal. A single catalytic converter element performs well for the disclosed system with a slightly compromised performance of the first stage 24.

The combustion gases from the engine 20 enter the catalytic converter first stage 24 at a normal engine exhaust temperature (approximately 1200° F.), after which the exhaust flow stream 27 is cooled as it passes through a thermoelectrical generator (TEG) 28 to somewhat reduce the stream temperature and generate electrical power which is transmitted by power line means 29 to an electrical power storage or consuming reservoir or circuit 30.

The exhaust stream 31 leaving the TEG 28 may be further cooled by a water injection means 44 and/or by being injected with a controlled quantity of air from a cooling air injector 33. The stream is then subjected to oxidation air injection by an inter-stage oxidation air injection means 36 and piped into a catalytic stage converter second stage 40, and thence to an outlet 42. There is provided by the present invention the system 10, shown in FIG. 4, for reducing nitrogen oxides, carbon monoxide, hydrocarbons and hydrogen gases in internal combustion engine exhausts and for simultaneously generating electrical power. The assembly 10 comprises the exhaust conduit 22 having an exhaust receiving end for connecting to and extending from the internal combustion engine 20, the first stage catalytic converter means 24 in communication with the exhaust gas conduit 22, and a thermoelectric generator (TEG) 28, adapted to receive engine exhausts from the exhaust flow stream conduit 27.

The exhaust flow stream conduit 27 facilitates movement of the engine exhausts from the first stage catalytic converter 24, to the TEG 28, using the hot exhausts for conversion to useful electrical energy and, in doing so, permitting some cooling of the exhausts. A cooling air injection conduit 32 may be provided, which receives air from the cooling air injector 33 and is in communication with a cooled exhaust conduit 34 exiting the TEG 28. An inter-stage oxidation air injection means 36 and conduit 38 are in communication with the cooled exhaust conduit 34, and the second stage catalytic converter 40 is in communication with the cooled and oxidized exhaust gas conduit 34, the second stage catalytic converter 40 having an exhaust emitting outlet 42.

If additional cooling of the exhausts in the cooled exhaust conduit 34 is desired, a cooling water source 44 may be placed in communication with the cooled exhaust conduit 34 by means of a cooling water conduit 48. The fluid cooler (cooling water source 44 and/or cooling air injector 33) can lower the temperature of the exhaust to Tmix=390-420° F.

In operation of the assembly of FIG. 4, exhaust gases from the engine 20 pass through the exhaust gas conduit 22 and into and through the first stage catalytic converter 24, and pass on to the exhaust flow stream conduit 27.

The exhaust gases from the first stage catalytic converter 24 are fed through the conduit 27 into the TEG 28 wherein heat is converted to electrical energy, which is fed by the power line 29 to an electrical storage unit, or circuit, electrically powered device 30.

The cooled exhaust gas of the TEG exhaust stream 31, and injected cooling air 32, if desired, and injected oxidation air from air conduit 38, proceed past the air injection conduit 38 and proceed to the second catalytic converter stage 40 and exit therefrom at the outlet 42.

The exhaust gas from the TEG 28 may be further cooled by cooling water injection from the cooling water conduit 48, There is further provided in conjunction with the assembly 10, shown in FIG. 4, a method for reducing nitrogen oxides, carbon monoxide, hydrocarbons, and hydrogen gas from exhausts of internal combustion engines and for generating electrical energy. The method comprises the steps of conveying the engine exhaust to the first stage catalytic converter 24, removing the exhausts from the first stage catalytic converter, through the exhaust gas outlet conduit 27, and directing the exhausts from the conduit 27 to the TEG 28, adapted to convert the exhausts high temperature into electrical energy which is removed from the system by the power line means 29 and directed to the electrical storage device and/or the electrically driven device 30. Thereafter, the exhaust gas 34 leaving the TEG 28 is injected with oxidation air by the oxidation air injector 36 by way of the air injection conduit 38.

The method further compromises directing the exhaust in the exhaust gas conduit 34 to the second stage catalytic converter 40, and discharging exhaust from the outlet 42 of the second stage catalytic converter 40, whereby to provide engine exhausts of less nitrogen oxides, less carbon monoxide, and less hydrocarbons and hydrogen gas, and simultaneously generating useful electrical power.

Figure 5:
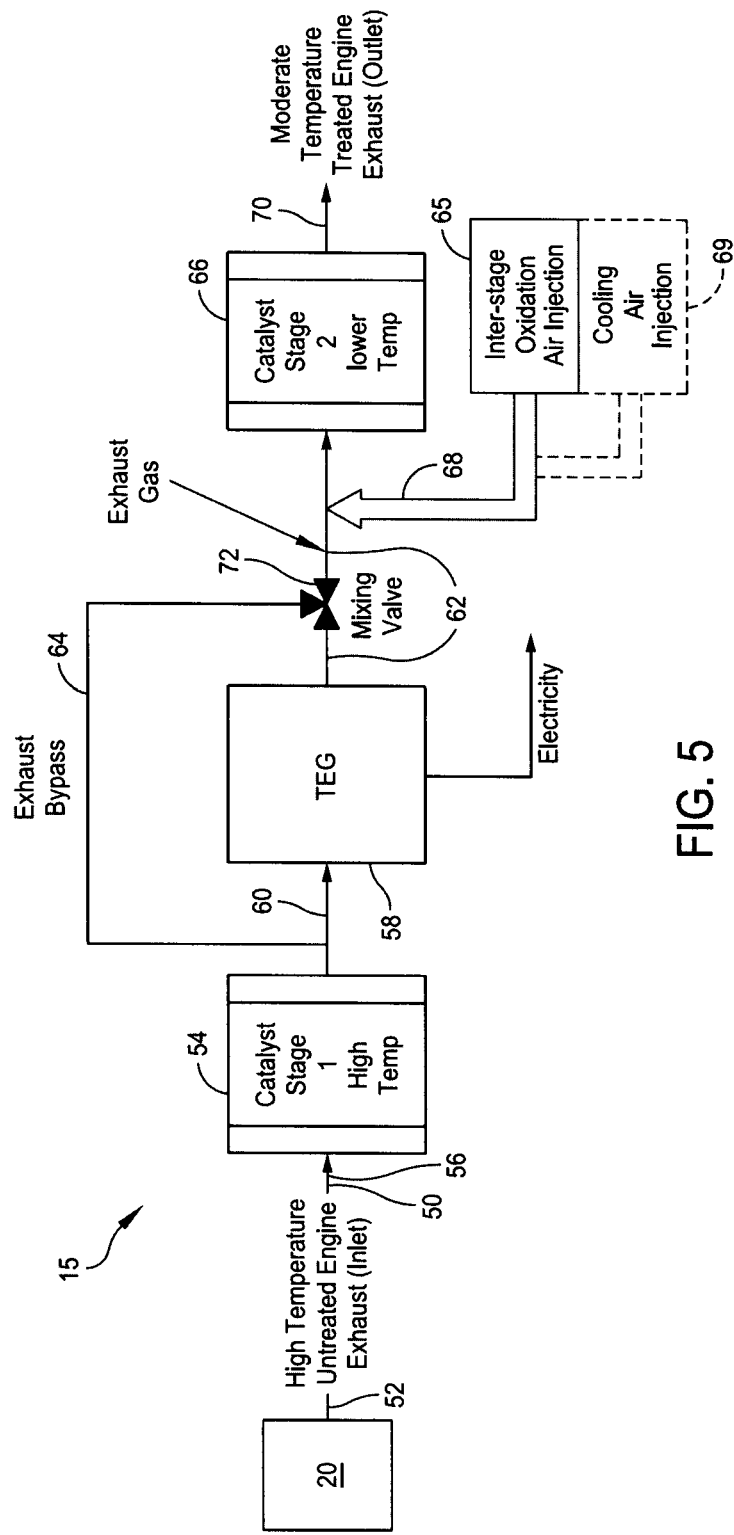
FIG. 5 is a diagrammatic depiction of an alternative assembly and method for reducing nitrogen oxides, carbon monoxide, hydrocarbons and hydrogen gas in the exhaust of an internal combustion engine and for providing an output of electrical energy.
Figure 6:
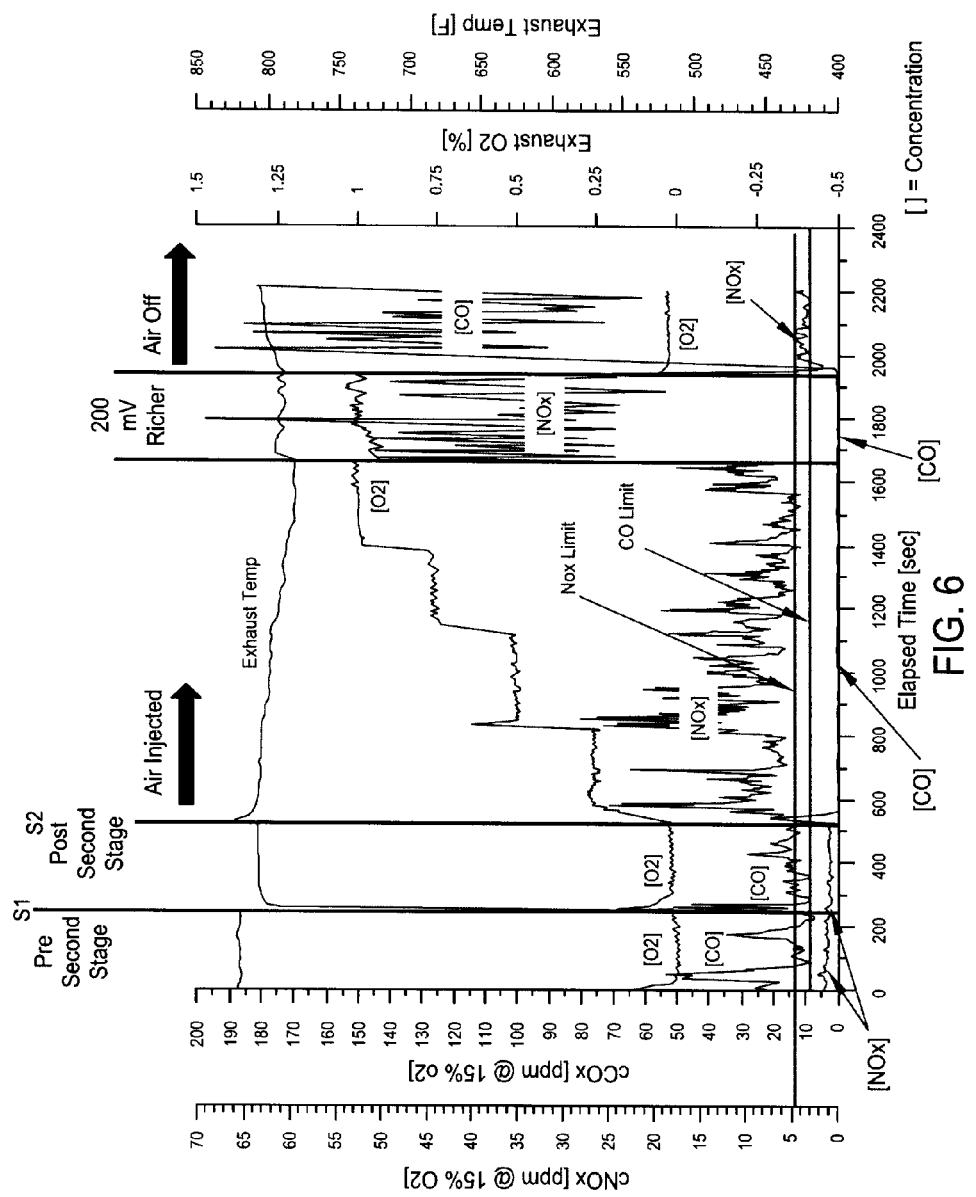
FIG. 6 is a chart illustrating the results of a Test 1 described hereinbelow.
Figure 7:
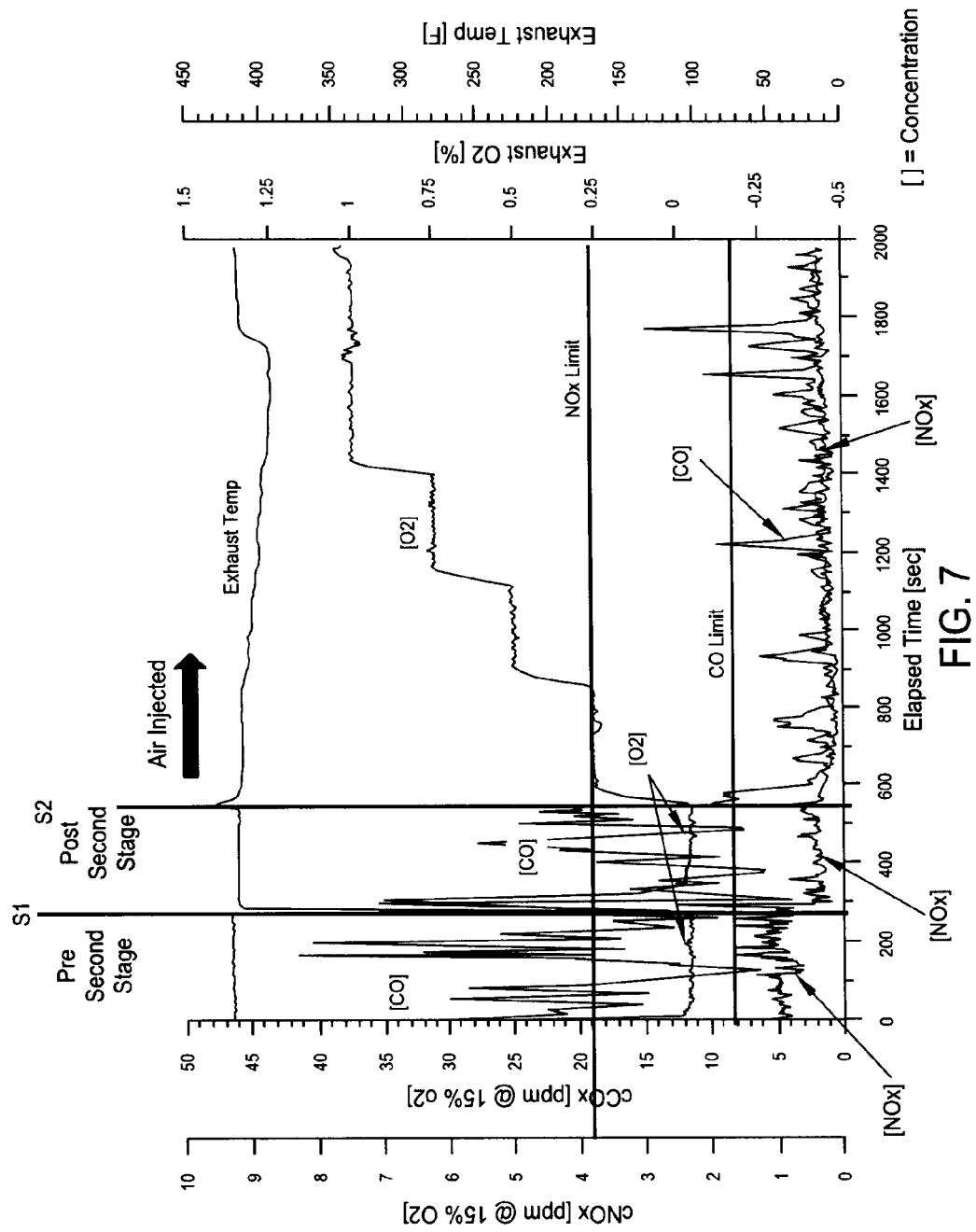
FIG. 7 is a chart similar to FIG. 6, but illustrating markedly different and greater improved reductions of nitrogen oxides and carbon monoxide in use of the assemblies of FIGS. 4-6.
Figure 8:
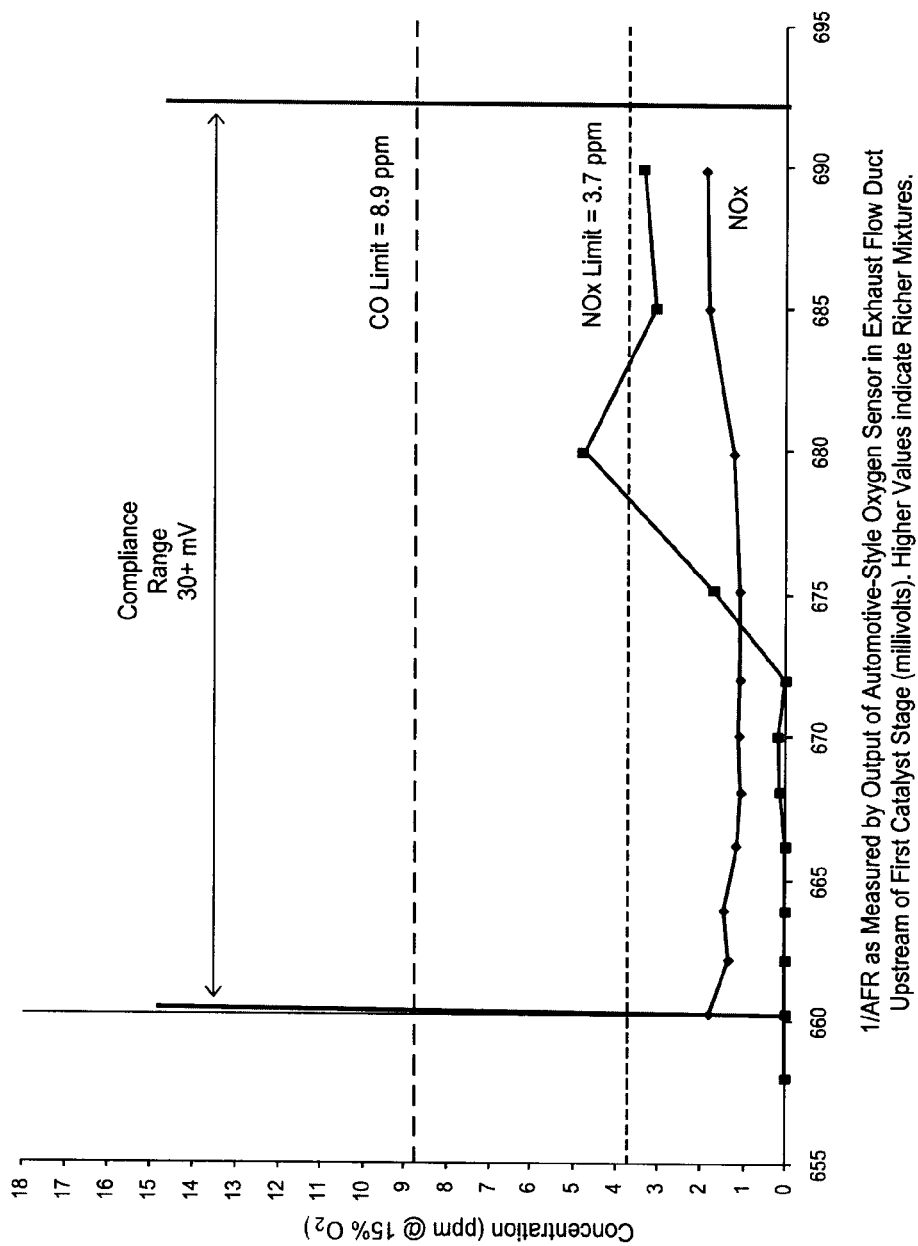
FIG. 8 is a chart showing that even with maladjustment of an air-to-fuel ratio controller, the inventive assemblies and methods provide for lower emissions and greater tolerance for excursions in engine air-to-fuel ratios.

There is further provided an alternative embodiment 15 of the assembly for reducing nitrogen oxides, carbon monoxide, hydrocarbons and hydrogen gas in internal combustion engine exhausts, the alternative assembly 15 being shown in FIG. 5 and comprising a first exhaust conduit 50 having an exhaust receiving end 52 connected to and extending from the internal combustion engine 20, a first stage catalytic converter 54 in communication with a dispensing end 56 of the first exhaust conduit 50, a TEG 58 in communication with the first stage catalytic converter 54 for receiving and utilizing exhaust heat for conversion to electrical power, a first portion of engine exhausts received from the first stage catalytic converter 54 entering the TEG 58 by way of a conduit 60. A conduit 62 for TEG exhausts extends from the TEG 58.

The assembly 15 further includes a TEG by-pass 64 in communication with the output conduit 60 of the first stage catalytic converter 54, and the conduit 62 for TEG exhaust. The TEG by-pass conduit 64 joins the TEG exhaust conduit 62 at a mixing valve 72. The joined exhausts from conduits 62 and 64, and from the mixing valve 72, are injected with air from an oxidation air injection conduit 68 extending from an air injection unit 65.

A second stage catalytic converter 66 is in communication with the TEG exhaust conduit 62, the TEG by-pass conduit 64, and the oxidation air injection conduit 68. An exhaust outlet 70 extends from the second stage catalytic converter 66.

If additional air injection is deemed advantageous, a cooling air injection means 69 may be provided in conjunction with the oxidation air injection unit or as an independent air injection means.

In operation of the assembly of FIG. 5, exhaust gases from the engine 20 flow to the first stage catalytic converter 54, the first portion 60 of the exhaust leaving the first catalytic converter 54 being directed to the TEG 58. A second portion 64 of the exhaust gas leaving the first catalytic converter 54 enters the by-pass conduit 64, which joins at the mixing valve 72 with the exhaust conduit 62 exiting the TEG 58. The exhausts from the TEG 58 and the by-pass conduit 64 combine, at the mixing valve 72, and are subjected to an injection of air from the oxidation air injection conduit 68, and directed to the second stage catalytic converter 66, from which the exhaust issues through the outlet 70 with greatly reduced nitrogen oxides, carbon monoxide, hydrocarbons, and hydrogen gas.

There is thus provided a further method for reducing nitrogen oxides, carbon monoxide, hydrocarbons, and hydrogen gas from exhausts of internal combustion engines and for generating electrical energy. The method comprises the steps of directing exhausts from the internal combustion engine to a first catalytic converter and dividing the exhausts therefrom into a first portion directed to a thermoelectrical generator and a second portion by-passing the thermoelectric generator, the first and second exhaust portions joining at a mixing valve. Cooled exhaust is directed from the mixing valve and is subjected to air injection and thereafter directed to a second catalytic converter and from there to an exhaust outlet. The first exhaust portion passing through the thermoelectric generator enables the thermoelectric generator to generate electrical power.

It is to be understood that the present invention is by no means limited to the particular constructions and method steps herein disclosed and/or shown in the drawings, but also comprises any modification or equivalent within the scope of the claims.

What is claimed is:

1. A method of operating a catalytic system for reducing emissions from a rich burn spark-ignited engine and for generating electric power, the method comprising:

controlling intake air and fuel (AFR) to the rich burn spark-ignited engine to produce first exhaust gases having a first oxygen content;

passing said first exhaust gases into a first-stage catalyst chamber containing a three-way catalyst (TWC) operating at 800° F. to 1,250° F., which minimizes NOx content by reducing NOx (to $N_2$ and $O_2$);

passing second exhaust gases exiting from the first-stage catalyst chamber to a (1) thermoelectric generator (TEG) for generating electric power and (2) to a thermoelectric generator exhaust conduit;

directing TEG output exhaust gases from the thermoelectric generator exhaust conduit to a fluid cooler to cool said TEG output exhaust gases, and thereafter enriching said TEG output exhaust gases to a second oxygen content, wherein the fluid cooler comprises a cooling water injection conduit in communication with the thermoelectric generator exhaust conduit; and passing the oxygen-enriched TEG output exhaust gases to a second-stage catalyst chamber containing a catalyst that minimizes CO content by oxidizing CO to $CO_2$.

2. The method of claim 1, further comprising producing said first exhaust gases using a stationary engine in a combined heat and power (CHP) application.

3. The method of claim 1, wherein the fluid cooler further comprises a cooling air injection conduit in communication with the thermoelectric generator exhaust conduit.

4. The method of claim 1, further comprising:

bypassing a portion of the second exhaust gases exiting from the first-stage catalyst chamber to a TEG bypass conduit; and combining the bypass portion and the TEG output exhaust gases to form a combined output.

* * * * *